Nov. 6, 1928.  1,690,146
W. O. VIVARTTAS ET AL
MOLDER
Filed March 26, 1925   2 Sheets-Sheet 1

Inventors:
William O. Vivarttas,
Louis T. Medholdt,
By Chindahl, Parker & Carlson Attys.

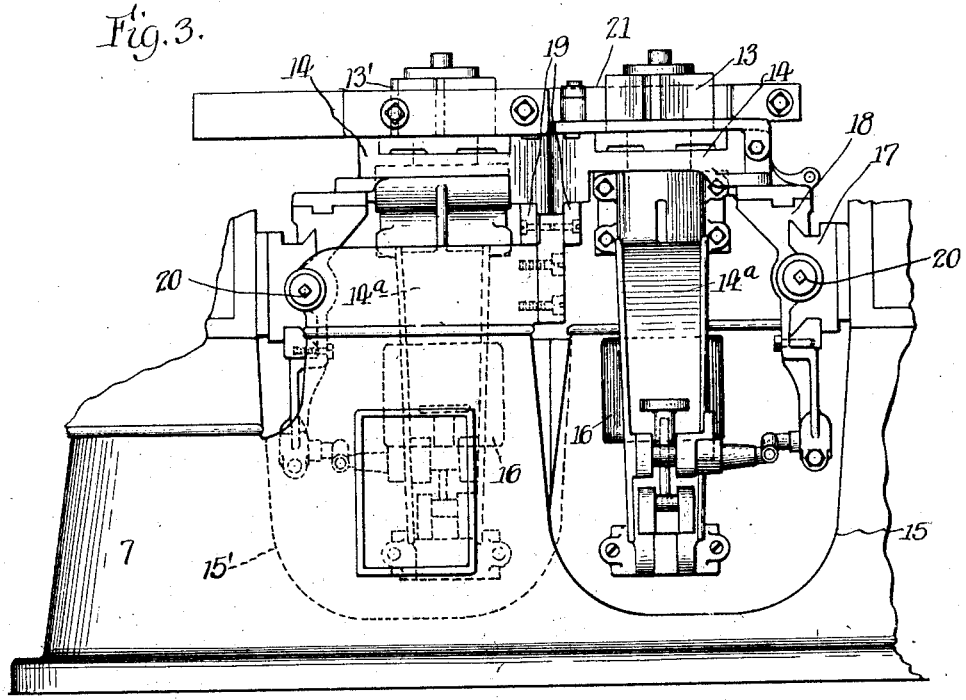
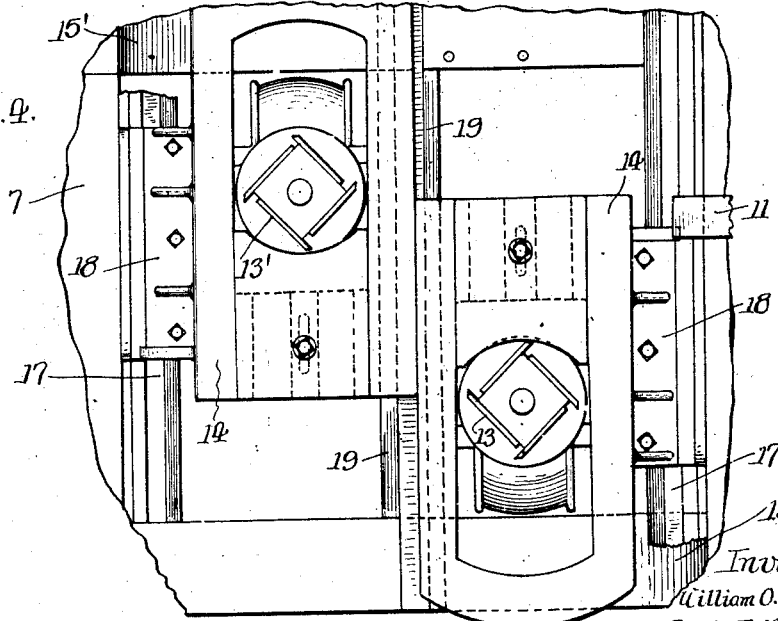

Patented Nov. 6, 1928.

1,690,146

UNITED STATES PATENT OFFICE.

WILLIAM O. VIVARTTAS AND LOUIS T. MEDHOLDT, OF ROCKFORD, ILLINOIS, ASSIGNORS TO MATTISON MACHINE WORKS, OF ROCKFORD, ILLINOIS, A CORPORATION OF ILLINOIS.

MOLDER.

Application filed March 26, 1925. Serial No. 18,361.

The invention has general reference to woodworking machines of the type generally known as molders. These machines commonly embody top and bottom cutter heads for surfacing the upper and lower sides of the work and two side cutter heads for operating on the side edges of the work. Our invention relates more particularly to the mounting of the side cutter heads of the molder.

The side cutter heads are commonly located one ahead of the other with reference to the feeding of the work for the reason that the cutters frequently embody blades of substantial depth or width which, when operating upon a relatively narrow piece of work, might overlap if placed directly opposite each other with a resulting interengagement and clashing of the blades. One of these side heads simply makes a surfacing cut to produce a smooth finish on one side edge of the work and the other head serves to make what is termed a paralleling cut, removing the excess of material up to a predetermined width.

With the staggered arrangement of the side cutter heads above referred to, opposing guides are employed with which the edges of the work opposite the cutters slidably engage, and it has long been the common practice in this art to position the side head which performs the paralleling cut ahead of the head which performs the surfacing cut. In some instances this arrangement is desirable, but in others it is desirable to locate the side heads relative to each other so that the surfacing cut is first performed and then the paralleling cut. One advantage in this latter arrangement is that the surfacing cut produces a smooth finish on the corresponding side edge of the work before it engages with the guide opposite the next side head which performs the paralleling cut and thus determines the width of the work. This arrangement, therefore, insures the highest degree of accuracy.

The object of our invention generally stated is to provide in a molder a construction and arrangement whereby the side cutter heads may be moved at will from a relation in which the paralleling cut is performed first and the surfacing cut last, to one in which the surfacing cut is performed first and the paralleling cut last; to the end that either arrangement may be employed to suit the convenience of the user.

A further object is to provide a construction for the machine whereby the two side cutter heads may be mounted for movement transversely of the base or bed quickly and easily by a simple adjustment of the two cutter heads and the opposing guides.

Figs. 1 and 2 of the drawings are plan views diagrammatic in character showing the two side cutter heads in their two relations.

Fig. 3 is a fragmentary side view of a molder showing the two side cutter heads mounted for transverse adjustment thereon.

Fig. 4 is a fragmentary plan view of the same.

Figure 1:
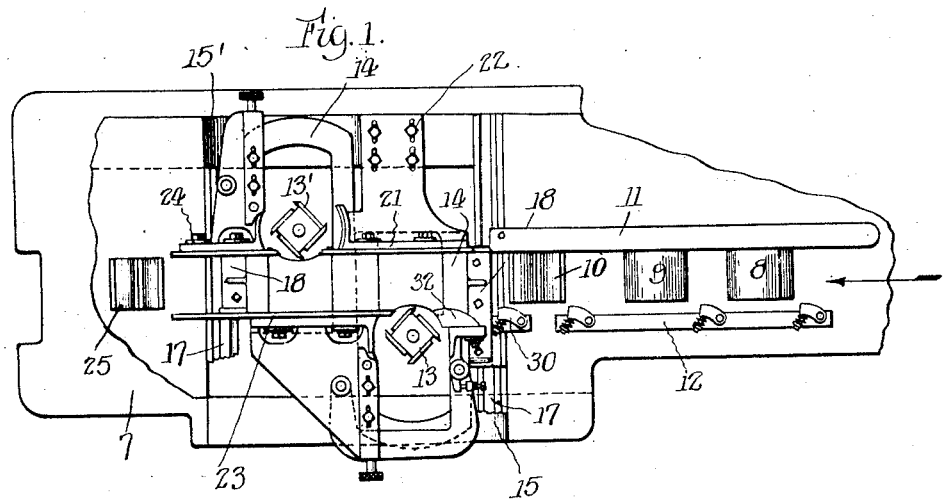

The molder selected for purposes of illustration comprises a bed or base 7 having feed rolls 8 and 9 operating to feed the work longitudinally through the machine in the direction of the arrows (Figs. 1 and 2). 10 is the top or horizontally disposed cutter head for surfacing the upper side of the work. 11 is a main or fixed guide against which the work is held by an adjustable and yieldable guide, generally designated by the numeral 12, during the passage of the work beneath the top head 10.

The side cutter heads, operating on vertical axes and upon the side edges of the work, are designated by the numerals 13 and 13'. They are each mounted in a supporting plate 14 from which is suspended a driving unit embodying an electric motor 16. To receive these units thus depending from the supporting plate 14 the bed is cut away or recessed at opposite sides as indicated at 15 and 15' to a lateral depth extending almost to the opposite side of the bed. Thus the recesses 15 and 15' open outwardly on opposite sides of the bed.

The supporting plates 14 are mounted for lateral adjustment at or near the upper sides of the recesses 15 and 15'. Thus at one side of each recess, secured to the bed, is a slideway 17 with which a guide member 18 secured to the under side of the table slidably engages. The opposite side edge of each plate 14 is supported by a transversely extending bar 19 rigidly secured to the bed at the opposite side of the recess near its upper edge. The bar 19 extends as shown in Fig. 4 across the bed to an extent approximately equal to the depth of the recess, and the guide 18 extends transversely a distance sufficient to enable the plate to be slid transversely of the bed to move the cutter head from one side of the work to the other. 20 indicates an adjusting screw whereby the supporting plate may be adjusted laterally on its ways 17 and 19.

Figure 2:
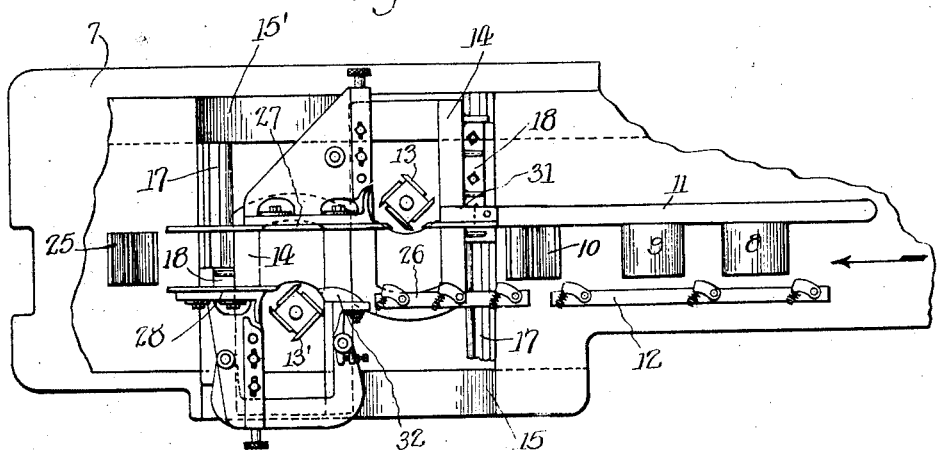

Thus it will be understood that the plates 14 carrying the side cutter heads 13 and 13' are supported in bridging relation to their respective recesses 15 and 15', in a manner such as to be movable transversely from one side of the bed to the other whereby to change the relative positions of the two cutter heads with respect to the feeding of the work, that is to say, to change them from a relation wherein the paralleling head performs its operation before the surfacing head as in Fig. 1, to a relation wherein the surfacing head first performs its operation, and then the paralleling head performs its operation, as shown in Fig. 2.

In each instance the two cutter heads are opposed by suitable guides for the opposite edges of the work. Thus in the relation shown in Fig. 1 the cutter head 13 is opposed by a guide 21 which is suitably secured by bolts 22 to the upper side of the frame at the closed end of the recess 15; and the cutter head 13' is opposed by a guide 23 suitably supported for lateral adjustment relative to the bed on the plate 14 supporting the cutter head 13. Similarly the table 14 carrying the cutter head 13' also supports a guide 24 on its side opposite the guide 21, which guide 24 coacts with the guide 23 in guiding the work over the bottom cutting head designated by the numeral 25.

In the relation shown in Fig. 2, the cutter heads 13 and 13' being transposed, a yielding guide device 26 is provided on the frame opposite the cutter head 13, this guide being similar in character to the guide 12. Opposite the cutter head 13' is a guide 27 supported by the supporting plate of the cutter head 13; and the plate supporting the cutter head 13' also supports a guiding device 28 opposing the guide 27 and coacting therewith to guide the work into engagement with the bottom cutter head 25. 30 and 31 designate guide devices employed in the case of Figs. 1 and 2 respectively, ahead of the cutter head 13, and 32 designates a chip breaker supported in one instance adjacent the cutter 13 and in the other instance adjacent and ahead of the cutter 13', these two cutters performing in their respective instances the paralleling cut.

It will be understood that the guides for the work may be of any suitable and well known character and form no part of our invention, but we believe we are the first to have produced a molder in which the two heads are mounted for adjustment relative to each other so as to position the head performing the paralleling cut either ahead of the surfacing cutter as in the case of Fig. 1, or following it as in the case of Fig. 2, thus rendering the machine adaptable for use either way as desired by the user.

We claim as our invention:

1. A molder having a base with two adjacent transversely disposed recesses of substantial depth opening at opposite sides of the base and extending substantially beyond the longitudinal center line of the base, supports bridging the respective recesses and movable transversely upon the base from one side thereof to the other, and a pair of side cutter heads mounted one in each of said supports and having individual driving units depending into said recesses and movable therein as the supports are moved from one side of the base to the other to change the positions of the cutter heads from one side of the work to the other, the arrangement being such that the cutters when on one side of the work perform a surfacing cut thereon and when on the other side perform a paralleling cut thereon.

2. A molder comprising a base having two sets of horizontally spaced transverse guideways, a pair of side cutter heads adapted to perform cutting operations on opposite sides of work moving longitudinally of the base, and supports for said heads movable one on each of said sets of guideways and having individual driving units for the respective heads suspended therefrom, the arrangement being such that the cutter head positioned on one side of the work performs a surfacing cut thereon and the cutter head on the other side of the work performs a paralleling cut thereon, and said supports being mounted for relative movement on the base from a position in which the surfacing cut is performed before the paralleling cut to a position in which the paralleling cut is performed before the surfacing cut.

In testimony whereof we have hereunto affixed our signatures.

WILLIAM O. VIVARTTAS.
LOUIS T. MEDHOLDT.